United States Patent [19]

Campbell

[11] 4,301,274

[45] Nov. 17, 1981

[54] AROMATIC SULFIDE/SULFONE POLYMER PRODUCTION

[75] Inventor: Robert W. Campbell, Bartlesville, Okla.

[73] Assignee: Phillips Petroleum Company, Bartlesville, Okla.

[21] Appl. No.: 116,434

[22] Filed: Jan. 29, 1980

[51] Int. Cl.$^3$ .................. C08G 75/16; C08G 75/20
[52] U.S. Cl. ........................... 528/388; 528/391
[58] Field of Search ............................ 528/388, 391

[56] References Cited

U.S. PATENT DOCUMENTS

| | | | |
|---|---|---|---|
| 3,790,536 | 2/1974 | Vidaurri | 528/388 |
| 4,016,145 | 4/1977 | Campbell | 528/388 |
| 4,125,525 | 11/1978 | Campbell | 528/388 |
| 4,127,713 | 11/1978 | Campbell | 528/388 |

FOREIGN PATENT DOCUMENTS 1078234  8/1967  United Kingdom.

*Primary Examiner*—Harold D. Anderson

[57] ABSTRACT

Aromatic sulfide/sulfone polymers are prepared by initially contacting a dihaloaromatic sulfone, an alkali metal sulfide, an organic amide, and, optionally, an alkali metal carboxylate under polymerization conditions and subsequently at or near completion of the polymerization reaction, adding an end-capping agent comprising additional dihaloaromatic sulfone to the reaction mixture producing a polymer exhibiting improved physical properties including melt flow stability. The resulting polymers have utility as coatings, films, molded objects, filaments, fibers, and the like.

15 Claims, No Drawings

AROMATIC SULFIDE/SULFONE POLYMER PRODUCTION

This invention relates to the production of polymers from aromatic compounds. In accordance with another aspect, this invention relates to the production of aromatic sulfide/sulfone polymers exhibiting improved physical properties including improved melt flow stability and the like. In accordance with another aspect, this invention relates to the production of aromatic sulfide/sulfone polymers having improved melt flow stability comprising introducing additional monomer at, or near, completion of the polymerization reaction to end-cap a polymer.

In recent years, a wide variety of high polymers have been prepared, many of which are currently being produced and marketed on a large scale. While such polymers are useful in many areas, one property of high polymer, particularly those of the thermoplastic type which needs to be improved, is the ability to withstand the high temperatures encountered in injection molding processes for an extended period of time. Since thermoplastic materials can be molded rapidly and efficiently into almost any desired shape, they lend themselves to mass production. A high polymer, especially a thermoplastic material which would stand high temperatures for an extended period of time without becoming unmanageably viscous exhibit desirable melt flow stability properties and could be used in such areas as electrical components, wire coatings, automotive parts, and the like, has been the objective of a great deal of research.

This invention provides a method for producing high molecular weight aromatic sulfide/sulfone polymers. The polymers of this invention are particularly characterized by improved melt flow stability compared to prior art polymers.

Accordingly, an object of this invention is to produce aromatic sulfide/sulfone polymers exhibiting high molecular weight.

Another object of this invention is to provide a process for producing high molecular weight aromatic sulfide/sulfone polymers exhibiting improved melt flow stability.

It is a further object of this invention to provide a process for the preparation of aromatic sulfide/sulfone polymers of improved melt flow stability suitable for injection molding.

Other objects and aspects, as well as the several advantages of this invention are apparent from a study of this disclosure and the appended claims.

In accordance with this invention, in the production of aromatic sulfide/sulfone polymers by employing a dihaloaromatic sulfone, an alkali metal sulfide, an organic amide, and, optionally, an alkali metal carboxylate, the addition at, or near, completion of the polymerization reaction, of an end-capping agent comprising dihaloaromatic sulfone to the reaction mixture results in an aromatic sulfide/sulfone polymer of improved melt flow stability compared to prior art polymers.

In one embodiment of the present invention, the dihaloaromatic sulfone, added as an end-capping agent, is the same as the dihaloaromatic sulfone initially used as reactant.

In another embodiment of the invention, the end-capping agent comprising additional dihaloaromatic sulfone which, preferably, is the same as the initial dihaloaromatic sulfone, and a solvent, preferably an organic amide corresponding to the organic amide initially used for preparation of the polymer is introduced into the reaction mixture at, or near, completion of the polymerization reaction.

The polymers of this invention are amorphous with a high glass transition temperature (Tg). They exhibit physical properties and melt flow characteristics suitable for injection moldable, high performance thermoplastics.

Dihaloaromatic sulfones that can be employed in the process of the invention have the formula

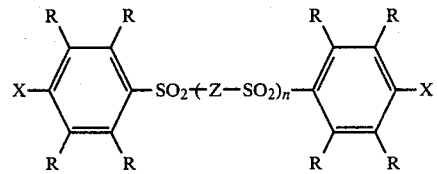

where each X is selected from the group consisting of fluorine, chlorine, bromine, and iodine; Z is a divalent radical selected from the group consisting of

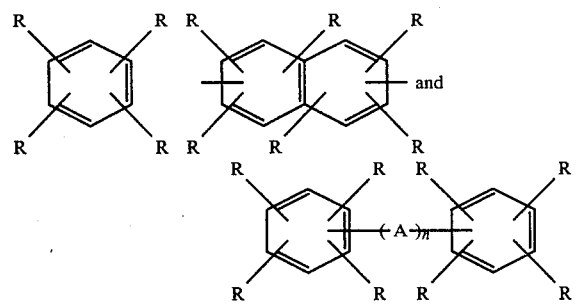

n is 0 or 1; A is selected from the group consisting of sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, each n is 0.

Bis(p-halophenyl) sulfones are presently preferred reactants in the process of this invention and can be represented by the formula

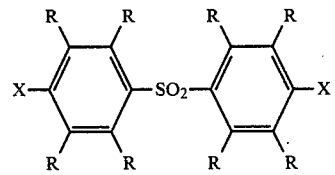

where each X is selected from the group consisting of fluorine, chlorine, bromine, and iodine, and each R is selected from the group consisting of hydrogen and alkyl radicals having 1 to about 4 carbon atoms, the total number of carbon atoms in each molecule being within the range of 12 to about 24.

Examples of some dihaloaromatic sulfones that can be employed in the process of this invention include bis(p-fluorophenyl)sulfone, bis(p-chlorophenyl)sulfone, bis(p-bromophenyl)sulfone, bis(p-iodophenyl)sulfone, p-chlorophenyl p-bromophenyl sulfone, p-iodophenyl 3-methyl-4-fluorophenyl sulfone, bis(2-methyl-4-chlorophenyl)sulfone, bis(2,5-diethyl-4-bromophenyl)- sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenyl-sulfonyl)biphenyl, bis[p-(p-chlorophenylsulfonyl)phenyl] sulfide, bis[p-(p-chlorophenylsulfonyl)phenyl]sulfone, bis-[p-(p-bromophenylsulfonyl)phenyl]methane, 5,5-bis[3-ethyl-4-(p-chlorophenylsulfonyl)phenyl]nonane, and the like, and mixtures thereof. Bis(p-chlorophenyl)sulfone is preferred.

Alkali metal sulfides that can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture. Sodium sulfide is especially preferred.

As is well known in the prior art for the preparation of aromatic sulfide/sulfone polymers or aromatic sulfide polymers, precursors of alkali metal sulfides can be employed in place of the alkali metal sulfide. For example, a combination of alkali metal bisulfide and alkali metal hydroxide known to react to form alkali metal sulfide and water can be employed.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof. N-methyl-2-pyrrolidone is especially preferred.

Small amounts of strong base, e.g., alkali metal hydroxide, can also be employed, if desired, with the other ingredients in the polymerization step of this invention.

The dihaloaromatic sulfones added to the reaction mixture as end-capping agents at or near completion of the polymerization reaction can be the same as (preferred) or different from (non-preferred) the dihaloaromatic sulfone employed as initial reactant in the process. The sulfones added subsequent to the initial reactants will be selected from those corresponding to the above generic formula. Bis(p-chlorophenyl)sulfone is presently preferred.

If desired, an alkali metal carboxylate can be employed with the initial ingredients of the above-described polymerization process. Usage of an alkali metal carboxylate generally results in an aromatic sulfide/sulfone polymer of higher molecular weight (as evidenced by higher inherent viscosity) than polymers prepared in the absence of alkali metal carboxylate.

Alkali metal carboxylates that can be employed in the process of this invention can be represented by the formula R'CO$_2$M, where R' is a hydrocarbyl radical selected from alkyl, cycloalkyl, and aryl, and combinations thereof such as alkaryl, aralkyl, and the like, the number of carbon atoms in said R' being within the range of 1 to about 20, and M is an alkali metal selected from the group consisting of lithium, sodium, potassium, rubidium, and cesium. Preferably, R' is an alkyl radical having 1 to about 6 carbon atoms or a phenyl radical and M is lithium. If desired, the alkali metal carboxylate can be employed as a hydrate or as a solution or dispersion in water.

Examples of some alkali metal carboxylates that can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof. Lithium acetate is presently preferred.

While I do not wish to be bound by theory, I currently believe that the polymer formed by the above process has recurring units consisting of

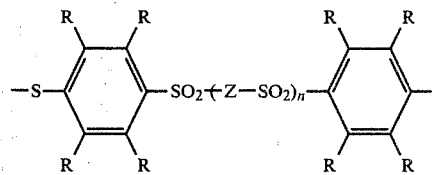

units, where each R, Z, and n is as defined above. In the absence of the inventive "end-capping" with dihaloaromatic sulfones, I believe that at least some of the end groups on the polymer chain correspond to mercaptide or mercaptan groups. Such reactive groups might react further (e.g., couple) at elevated temperature. Hence, the recognized melt flow instability of prior art aromatic sulfide/sulfone polymers can be caused by such further reactions and can be improved in the present invention by capping the reactive end groups with a diaromatic sulfone-containing group.

A wide variety of reaction conditions can be employed in the practice of the invention. The reaction conditions under which the reactions involved in the invention will take place are within the scope of the invention. Similarly, any proportions of reactants which will react with each other to produce a product polymer of the invention are within the scope of the invention. However, as will be understood by those skilled in the art in view of this disclosure, certain reaction conditions and reactant proportions are favored for economic reasons, i.e., the reactions proceed faster and give greater yields for some reaction conditions and some proportions of reactants.

Although the mole ratio of dihaloaromatic sulfone in the initial mixture of reactants to alkali metal sulfide can vary over a considerable range, generally it will be within the range of about 0.9:1 to about 2:1, preferably about 0.95:1 to about 1.2:1. When the polymer is to be employed in applications such as injection molding, where good melt processability is desired, a mole ratio of dihaloaromatic sulfone to alkali metal sulfide within the range of about 1:1 to about 1.03:1 is preferred. The mole ratio of alkali metal carboxylate to alkali metal sulfide can vary over a wide range but generally will be within the range of about 0.05:1 to about 4:1, preferably about 0.1:1 to about 2:1. The amount of organic amide can vary greatly, generally being within the range of about 100 grams to about 2500 grams per gram-mole of alkali metal sulfide.

The amount of alkali metal hydroxide can likewise vary greatly, but will generally be in the range of 0 to about 1, and preferably 0.0001 to about 0.1 mole per mole of alkali metal sulfide.

Although the reaction temperature at which the polymerization is conducted can vary over a considerable range, generally it will be within the range of about 170° C. to about 240° C., preferably about 180° C. to about 220° C. The reaction time can vary widely, depending in part on the reaction temperature, but generally will be within the range of about 10 minutes to about 3 days, preferably about 1 hour to about 8 hours. The pressure should be sufficient to maintain the dihaloaromatic sulfone and organic amide substantially in the liquid phase.

The amount of dihaloaromatic sulfone employed as an end-capping agent at or near completion of polymerization is generally in the range of about 0.01:1 to about 0.2:1 moles per mole of alkali metal sulfide, and preferably in the range of about 0.02:1 to about 0.1:1 moles per mole of alkali metal sulfide.

The end-capping agent is frequently added to the reaction mixture immediately prior to the work-up and polymer isolation steps. Thus any suitable temperature can be employed, e.g., from about 170° to about 240° C., though it is most convenient to employ whatever temperature is achieved in the polymerization process at the desired time of addition of end-capping agent.

It is also sometimes desirable to add the end-capping agent near the end of polymerization step. The appropriate time is, of course, dependent on the reactivity of starting materials and the polymerization temperature. It is known in the art that degree of polymerization is dependent upon the length of time that the polymerization has been allowed to proceed. Thus, when operating within the preferred polymerization temperature range given above, the time for addition of end-capping agent will generally be between 1.5 and 6 hours after the desired temperature is reached. It will be recognized, however, that lower temperatures will sometimes require longer times before end-capping and higher temperatures will somes require shorter times before addition of end-capping agent.

It is usually desirable to maintain reaction conditions of temperature and pressure for a period of time ranging from about 1 minute to about 5 hours after addition of end-capping agent, though satisfactory results are usually obtained with a further reaction time of about 5 minutes to about one hour.

The end-capping agent can be added to the reaction mixture neat or as a solution in suitable solvent. It is presently preferred to employ the organic amide used in the polymerization process as solvent. The amount of solvent is not critical, though it is not usually desirable (for economic reasons) to employ more than 50 weight percent of that originally used.

It is to be understood that the process of this invention can be carried out by mixing the initial amount of dihaloaromatic sulfone, the alkali metal sulfide, the optional alkali metal carboxylate, and the organic amide in any order. It is also to be understood that a composite can be formed of any two or more of these substances with the remaining substance or substances being introduced in the composite. Furthermore, it is to be understood that these substances can be employed in the form of aqueous mixtures of hydrates and that subsequent to any step of contacting substances, water can be removed from the resulting composition, e.g., by heating, distilling, and the like. For instance, water can be removed by distillation from a mixture of the organic amide, the alkali metal carboxylate, e.g., in anhydrous form or as a hydrate, and the alkali metal sulfide in hydrated form or as an aqueous mixture, after which the residual mixture can be admixed with the dihaloaromatic sulfone and the resulting mixture then maintained at polymerization conditions until the desired time when the end-capping agent is added.

In one presently preferred embodiment, the alkali metal sulfide, the alkali metal carboxylate, the organic amide, the initial amount of dihaloaromatic sulfone, and alkali metal hydroxide are mixed and then subjected to polymerization conditions which form an aromatic sulfide/sulfone polymer. The heating can be carried out at a temperature in the range of about 170° C. to about 240° C. although temperatures of about 200° C. to about 210° C. have been found satisfactory. About 2.5 to 5 hours at these conditions is satisfactory for the polymerization step. Then without further cooling or heating, the dihaloaromatic sulfone as endcapping agent dissolved in organic amide is added and after the further desired reaction time the polymer is isolated.

The aromatic sulfide/sulfone polymers produced by the process of this invention can be separated from the reaction mixture by conventional procedures, e.g., by filtration of the polymer, followed by washing with water, or by dilution of the reaction mixture with water, followed by filtration and water washing of the polymer. Preferably, at least a portion of the washing with water is conducted at an elevated temperature, e.g., within the range of 130° C. to about 250° C., preferably about 160° C. to about 230° C., to provide a polymer which is low in ash-forming substances and is relatively light in color and of good clarity, as well as exhibiting good melt flow stability under conditions of melt processing operations such as injection molding. A volatile ketone, such as acetone, is also useful as a washing agent to provide high-quality polymer.

The aromatic sulfide/sulfone polymers produced by the process of this invention can be blended with fillers, pigments, extenders, other polymers, and the like. They can be cured through crosslinking and/or chain extension, e.g., by heating at temperatures up to about 480° C. in the presence of a free oxygen-containing gas, to provide cured products having high thermal stability and good chemical resistance. They are useful in the production of coatings, film, molded objects, and fibers. The polymers exhibit a good balance of properties for these uses, the heat deflection temperature being particularly outstanding.

EXAMPLE

The following inventive and comparative runs were conducted to prepare poly(phenylene sulfide/sulfone) resins.

For runs 1 to 6 a one liter reactor was employed. To the reactor was added sodium sulfide (0.5 gram-mole), sodium hydroxide (0.005 gram-mole), lithium acetate (0.5 gram-mole), N-methyl-2-pyrrolidone (2.0 gram-moles) and bis(4-chlorphenyl)sulfone (0.5 gram-mole). The reactor was flushed with nitrogen, sealed and heated with stirring at 200° C. for the times specified in the table. In inventive runs 3 to 6 bis(4-chlorophenyl) sulfone dissolved in N-methyl-2-pyrrolidone was then added and heating and stirring continued for the specified time period. To comparative run 2 only N-methyl-2-pyrrolidone [without bis(4-chlorophenyl)sulfone] was added after the specified reaction time. After the reactor was cooled and opened, the solid product was washed several times with hot water and hot acetone. The polymer was dried at reduced pressure at 80° C., then at 150° C., under nitrogen atmosphere. Melt flow was determined at 345° C. using a 5 kg weight with a 2.1×8.0 mm die and calculated as grams per 10 minutes for the first minute of flow and percent retention of that value for the fifth minute of flow.

TABLE

| Run No. | Reaction Time, Hrs. | End-Capping | | | | Melt Flow[c] | |
|---|---|---|---|---|---|---|---|
| | | BCPS[a] Mole | NMP[b] Mole | Capping Time, Min. | Temp. °C. | Orig. | % Ret. |
| 1 (Comp.) | 5 | — | — | — | — | 1.2 | 32 |
| 2 (Comp.) | 5 | — | 0.5 | 30 | 200 | 1.2 | 63 |
| 3 (Inv.) | 5 | 0.025 | 0.5 | 30 | 200 | 2.6 | 77 |
| 4 (Inv.) | 5 | 0.025 | 0.5 | 30 | 220 | 3.0 | 87 |
| 5 (Inv.) | 5 | 0.025 | 1.0 | 30 | 200 | 2.2 | 81 |
| 6 (Inv.) | 2.5 | 0.05 | 0.5 | 60 | 200 | 7.8 | 79 |

[a]BCPS = bis(4-chlorophenyl)sulfone.
[b]NMP = N-methyl-2-pyrrolidone.
[c]Orig. = flow for the first minute calculated on 10 minute basis.
% Ret. = (flow in the fifth minute) × 100/(flow in the first minute).

The data in the above table demonstrate a significant improvement in melt flow stability in inventive runs 3–6 compared to prior art run 1. The improvement in melt flow stability is even larger than that expected from addition of N-methyl-2-pyrrolidone alone as seen by comparison with comparative run 2.

In larger scale inventive runs conducted employing sodium sulfide, sodium hydroxide, lithium acetate, N-methyl-2-pyrrolidone and bis(4-chlorophenyl)sulfone in gram-molar amounts of 6.0, 0.067, 6.0, 24 and 6.0, respectively, and end-capping with bis(4-chlorophenyl)sulfone (0.3 mole) in N-methyl-2-pyrrolidone (2.0 mole) for 30 minutes at 200° C. after 5 hours at 200° C. for polymerization, melt flow stability of 70 percent (measured as described above) was obtained. Thus the utility of this invention for scaled-up runs was demonstrated.

I claim:

1. In a process for the production of an aromatic sulfide/sulfone polymer comprising contacting a dihaloaromatic sulfone, an alkali metal sulfide, and an organic amide under polymerization conditions sufficient to cause the reactants to react and form said polymer, the improvement for increasing melt flow stability of the polymer produced by said contacting which comprises end-capping the polymer by introducing a small, but effective, amount sufficient to impart increased melt flow stability of additional dihaloaromatic sulfone into the crude reaction mixture at or near completion of the polymerization reaction.

2. A process according to claim 1 wherein said additional dihaloaromatic sulfone used as end-capping agent is the same as the dihaloaromatic sulfone used for initial contacting.

3. A process according to claim 1 wherein the amount of additional dihaloaromatic sulfone employed as end-capping agent ranges from about 0.01:1 to about 0.2:1 moles per mole of alkali metal sulfide and said end-capping agent is added between 1.5 and 6 hours after the desired polymerization temperature is reached.

4. A process according to claim 1 wherein said additional dihaloaromatic sulfone is introduced into the crude reaction mixture in a solvent.

5. A process according to claim 1 wherein an alkali metal carboxylate is present during contacting of said dihaloaromatic sulfone, said alkali metal sulfide, and said organic amide to increase the molecular weight of the produced polymer.

6. A process according to claim 1 wherein the temperature during the introduction of end-capping agent is in the range of about 170°–240° C. and the reaction conditions are maintained from about 1 minute to about 5 hours after addition of the end-capping agent.

7. A process according to claim 1 wherein said additional dihaloaromatic sulfone end-capping agent is the same as the dihaloaromatic sulfone used in the initial contacting and is introduced into the crude reaction mixture in an organic amide corresponding to the organic amide used in the initial contacting.

8. A process according to claim 5 wherein the initial reactants are bis(4-chlorophenyl)sulfone, sodium sulfide, N-methyl-2-pyrrolidone and lithium acetate and the end-capping agent is bis(4-chlorophenyl)sulfone which is introduced into the crude reaction mixture dissolved in N-methyl-2-pyrrolidone.

9. A process for the production of a high molecular weight aromatic sulfide/sulfone polymer exhibiting improved physical properties which comprises:
  (a) initially contacting
    (1) at least one dihaloaromatic sulfone,
    (2) at least one alkali metal sulfide, and
    (3) at least one organic amide under polymerization conditions of temperature ranging from about 170°–240° C. for a period of time sufficient to form said polymer,
  (b) adding a small but effective amount sufficient to impart increased melt flow stability of an end-capping agent comprising a dihaloaromatic sulfone to the crude reaction mixture thus formed in step (a) about 2½ to about 5 hours after reactants (1), (2), (3) and (4) have been subjected to said polymerization conditions, and
  (c) subjecting the reaction mixture containing said end-capping agent obtained in step (b) to said polymerization conditions for a period of time sufficient to form said high molecular weight aromatic sulfide/sulfone polymer having improved melt flow stability.

10. A process according to claim 9 wherein (1) and said end-capping agent in step (c) are the same dihaloaromatic sulfone.

11. A process according to claim 9 wherein said end-capping agent is introduced in step (b) in a solvent comprising an organic amide corresponding to (3).

12. A process according to claim 9 wherein an alkali metal carboxylate is present during contacting of (1), (2), and (3) in step (a) to increase the molecular weight of the produced polymer.

13. A process according to claim 9 wherein step (c) is carried out for about 1 minute to about 5 hours after the end-capping agent is added in step (b).

14. A process according to claim 12 wherein
  (1) is bis(4-chlorophenyl)sulfone,
  (2) is sodium sulfide,
  (3) is N-methyl-2-pyrrolidone,
  (4) is lithium acetate, and said end-capping agent in step (b) is bis(4-chlorophenyl)sulfone.

15. A process according to claim 14 wherein said end-capping agent is introduced into the crude reaction mixture dissolved in N-methyl-2-pyrrolidone.

* * * * *